May 9, 1967            J. MacPHEE            3,318,776

TWO PASS PRESSURE TUBE RESEARCH REACTOR

Filed Dec. 23, 1960            5 Sheets-Sheet 1

INVENTOR.
JOHN MACPHEE

BY
Arthur J. Plantamura
ATTORNEY

INVENTOR.
JOHN MACPHEE
BY
Arthur J. Plantamura
ATTORNEY

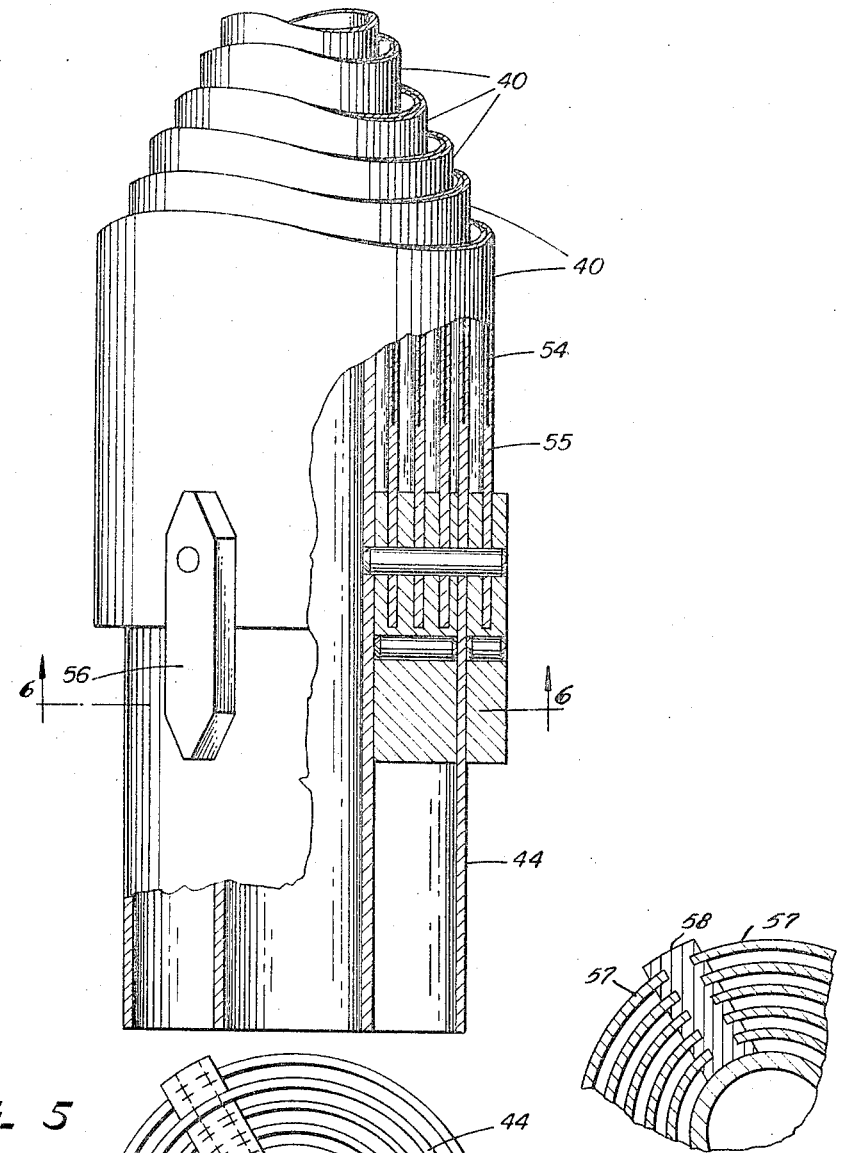
FIG. 5
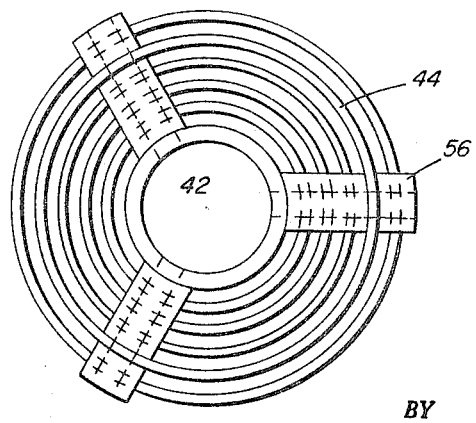
FIG. 6
FIG. 7
INVENTOR.
JOHN MACPHEE
BY Arthur J. Plantamura
ATTORNEY

United States Patent Office 3,318,776
Patented May 9, 1967

3,318,776
TWO PASS PRESSURE TUBE RESEARCH REACTOR
John MacPhee, Rowayton, Conn., assignor to American Machine & Foundry Company, a corporation of New Jersey
Filed Dec. 23, 1960, Ser. No. 78,104
6 Claims. (Cl. 176—61)

This invention relates to nuclear reactors of the tank or swimming pool type and more specifically relates to improvements in the active core and cooling system of such reactors.

In reactors of the tank or swimming pool type in which nuclear fission is permitted to occur, the items of main consideration are the core, the cooling system, the control system and a shield to prevent biological damage. In such systems, the fuel elements comprising the active core are generally situated in a plate or grid submerged to depths of from about 15 to 30 feet in water which acts as shield.

Heretofore, in a tank or pool type facility, operating power levels have been limited by the tolerable activity of contaminated water rising to the surface of the tank or pool. Various efforts to minimize the activity at the surface such as by enclosing the core in a tank or by removal and recirculation of a top layer of the shielding liquid have disadvantages; the former by making the core less accessible, and the latter by becoming impractical at power levels greater than about 20 megawatts.

The present invention provides a novel and effective system permitting a very substantial increase in obtainable power levels without increasing flow rates, number of fuel elements or other characteristics of reactors of the tank or pool type. Conversely, the invention provides a means for obtaining power levels obtainable heretofore only with much larger equipment such as piping, pumps, etc., and at higher operating costs.

Heretofore, reactors of the swimming pool or tank type have comprised generally an assemblage of enriched uranium fuel element which consist of hollow bundles of plates or units of other configurations through which the shielding water from the pool flows, for example, by natural convection. Alternately water is discharged from the shielding pool through the core and a plenum chamber, and is recirculated to the pool after appropriate treatment such as by passage of the cooling stream through a heat exchanger and/or through a purification step.

I have found that a very substantially improved system providing increased power levels is obtained in open pool or tank reactors without increasing total coolant flow or equipment size of the reactor assembly by use of a core, according to the invention, which comprises a fuel element in a separately housed pressure tube. In essence, the fuel plates of the pressure tube housed element are isolated from the shielding water and the plates are cooled by multipassage of coolant in contact therewith.

It is an object of the present invention to provide an improved reactor system of the open pool or tank type in which the power output for a given flow rate is substantially higher than a reactor of this type of comparable size heretofore available.

It is a further object of the invention to provide a reactor comprising a core of individually housed pressurized fuel elements capable of greatly improved power output, the fuel elements of which are readily accessible and in which the versatility of an open tank reactor is maintained.

It is a further object of the invention to provide a reactor in which the coolant flows in a closed loop in a multi-pass contact of the fuel plates housed in pressure tubes isolating the fuel plates from the shielding water.

It is still a further object of the invention to provide a reactor employing shielding water in which the shield water is far less contaminated than reactors of the open tank type at comparable power levels.

It is still a further object of the invention to provide a reactor core in which the fuel plates are isolated from the shield water but in which the arrangement is such that the individual fuel element can be checked by monitoring the cooling temperature in the interpass of the fuel elements.

A further object of the invention is to provide a reactor arrangement which lends itself to increased power levels and which retains the versatility and accessibility of the open type pool and tank reactors.

Still another object of the invention resides in an arrangement which fuel elements may be reversed within the core permitting higher burn-up than are obtainable with a non-reversible element.

Additional objects and advantages will become apparent as the invention is described in greater detail in conjunction with the drawings hereinbelow. In the drawings:

FIG. 5 is a longitudinal sectional view of the fuel element further illustrating a method of arrangement of individual fuel plates.

FIG. 6 is a cross sectional view of the fuel element taken substantially along the line 6—6 of FIG. 5.

FIG. 7 is a fragmentary sectional view of a modified form of fuel plates.

In general, the present invention provides an improved reactor of the tank or pool type which has the advantage of relatively easy accessibility but which is so modified that a separate cooling loop for the reactor core is provided in which the coolant for the core is isolated from the shielding water. Separate cooling and shielding water permits coolant pressurization and very substantially reduces shield water contamination.

Power levels may be increased in the order of twofold and more over reactors having comparable flow rates without the necessity of using cumbersome and expensive shielding auxiliaries such as plastic shields near the tank surface and/or layers of demineralized water near the surface of the shielding water. In the reactor of the invention, a core is employed comprising an assemblage of fuel elements individually encased in a pressure housing through which coolant is flowed. An essential feature resides in the passage of the coolant in more than one pass through the fuel plate (or plates) of each element before the coolant leaves the element and is recirculated through a heat exchanger. At all times the coolant flow servicing the core elements is isolated from the shielding water of the tank or pool.

Figure 1:
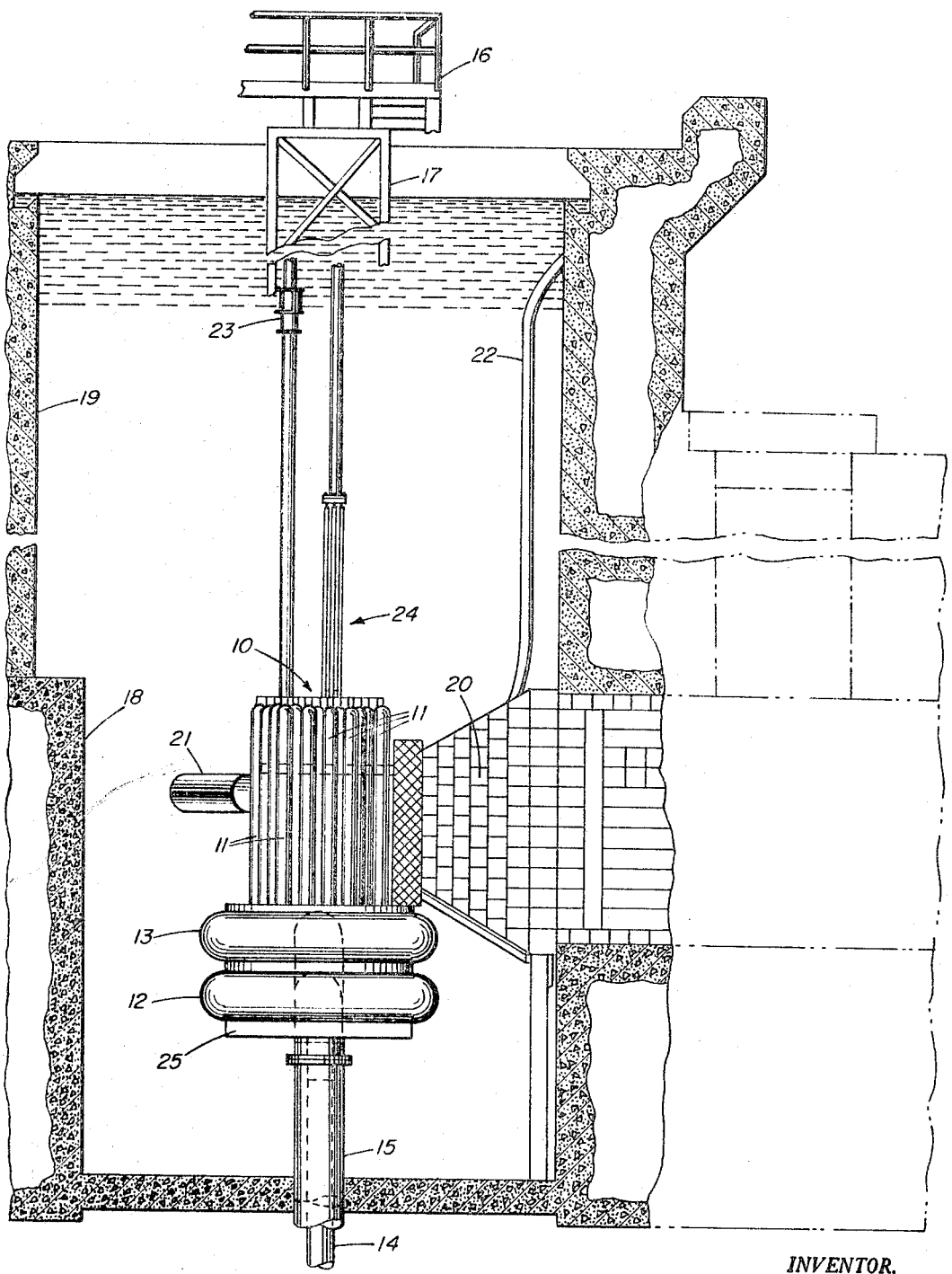
FIG. 1 is a vertical sectional view of part of a nuclear reactor of the type in which the active core is immersed in a pool of water illustrating the core and coolant system therefor which is isolated from the shielding water of the pool.

Referring to FIG. 1, a general arrangement of a tank type nuclear reactor is shown which comprises an active core 10 of individually enclosed pressurized fuel elements 11. These elements are mounted on a plenum chamber arrangement comprising an inlet manifold 12 and an outlet manifold 13 through which coolant enters by inlet conduit 14 and exits by way of outlet conduit 15. The details of the nuclear reactor core and coolant system will be described more particularly hereinbelow in connection with the subsequent figures of the drawing.

The following items of more or less conventional arrangements are illustrated in FIG. 1 for the purposes of providing a more complete disclosure—as such they form no part of the present invention—at 16 is shown a conventional control platform suitably supported by the tower 17. The tank walls adjacent to the active core are formed of relatively dense concrete of the type conventionally used for this purpose such as Barytes concrete. The upper walls 19 are formed generally of regular concrete. Thermal column 20 comprising stacked graphite and lead assembly functions as a neutron moderator to slow down fast neutrons for radiation experiments. Conventional beam tubes only one, 21, of which is illustrated radiate in horizontal direction from the reactive core. These comprise generally an aluminum sleeve, an aluminum liner and interior shielding blocks of canned high density concrete and lead. A pneumatic rabbet 22 comprising a concentric aluminum air line carries a sample carrier or rabbet into high neutron flux areas at the core. This facility is equipped with suitable controls for varying the period of sample irradiation. Suitable conventional means for reversing of the air valve is employed. Exhausting of the rabbet may be accomplished by connecting it to the main exhaust system of the building which is vented to the stack. At 23, hydraulic rabbet, used to radiate material for periods ranging from several seconds to an indefinite time, directly in the path of the reactive core neutron flux is illustrated. This facility comprises two concentric aluminum tubes acting as a conveyor for the aluminum container down to the core level. A conventional motor driven centrifugal pump (not shown) furnishes the necessary hydraulic pressure to operate this facility. Water discharged from this assembly is ejected into the tank. A control rod arrangement is illustrated generally at 24.

Figure 2:
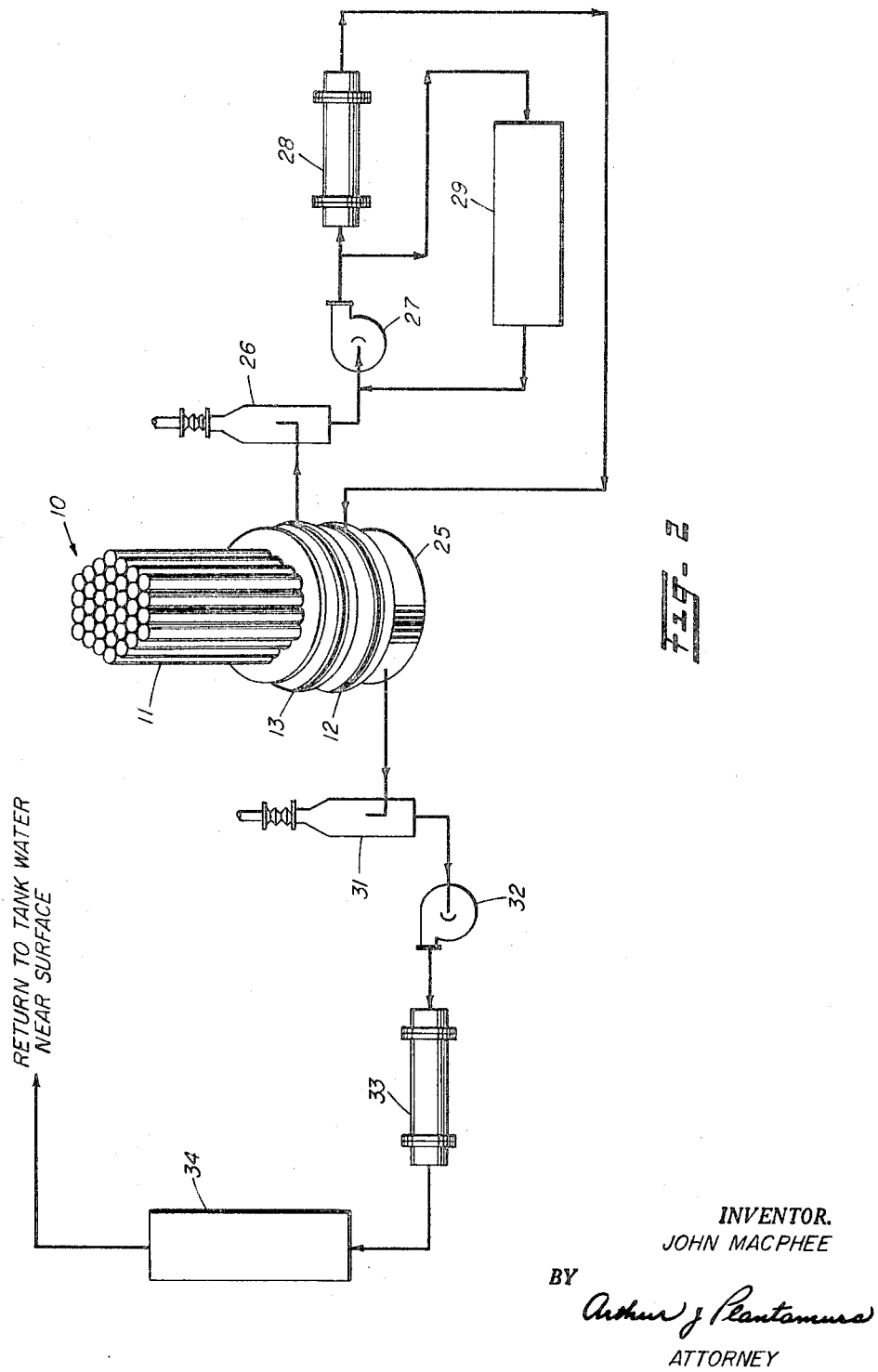
FIG. 2 is a schematic view of the core illustrating a lattice arrangement of individual fuel elements forming the core mounted on a plenum chamber, the lower part of which is a manifold to feed coolant to the individual elements and the upper part of which collects the coolant after passage through the fuel elements for circulation to a heat exchanger.
Figure 3:
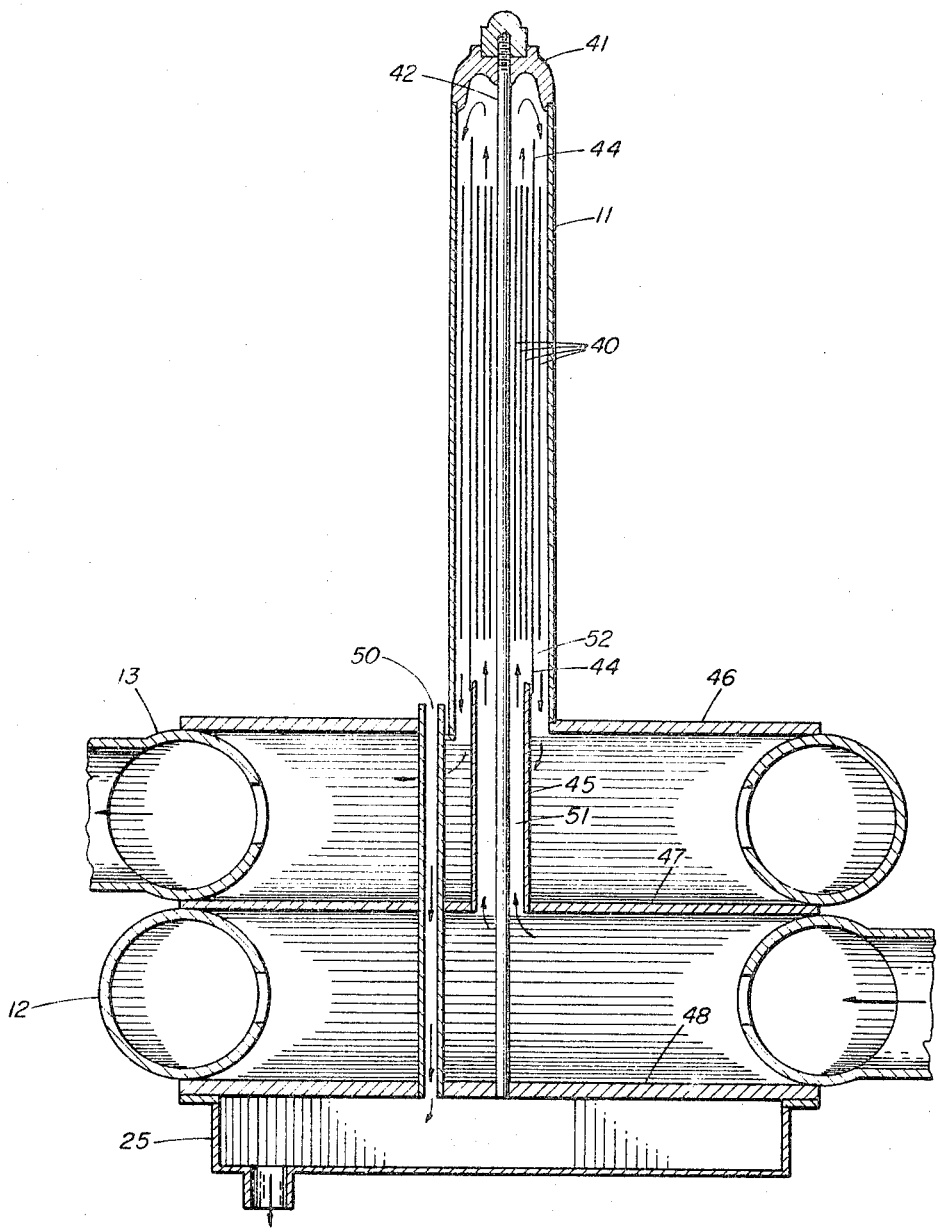
FIG. 3 is a diagrammatic view through a single fuel element and the plenum chambers illustrating more clearly the path of flow of the coolant therethrough.

Referring to FIGS. 2 and 3, the closed cycle coolant passages which form an essential part of the invention are described in greater detail. FIG. 2 illustrates schematically an active core comprising a plurality of individually mounted fuel elements. It will be apparent that the invention is not limited to any particular number or arrangement of these fuel elements. As shown more clearly in the illustration of FIG. 3, each of these fuel elements is mounted on a grid assembly which comprises the outlet manifold 13, the inlet manifold 12 and a tank water collector header 25. Water which is removed from the reactor core is continually recirculated. The coolant extracted from the outlet manifold 13 of the core assembly 10 flows through aluminum piping through a degassifier 26 to the reactor coolant circulating pump 27 and is pumped through the heat exchanger 28 by the circulating pump 27 and returned into the inlet manifold 12 of the core assembly. If it is desired to provide greater pressure for the reactor coolant, the cooling loop may be provided with a suitable arrangement such as an elevated surge tank (not shown) connected between the core outlet, and the circulating pump. Where water is used as the coolant, for example, the pressure may be 100 p.s.i.g. at the core inlet end and the total pressure drop through the core may be approximately 50 p.s.i. Other suitable coolant fluids e.g. organic or inorganic liquids or gases may be used. In the use of water, the cooling water may be continually purified by a take-off system, tapped off from the circulating loop on the downstream side of the pump and passed through the demineralizing column 29. The tank water collector header shown at 25 is utilized to continually recirculate tank water. As shown, water from the tank is drawn through the pool water bleed tube 50 (see FIG. 3) adjacent to reactor core and passes from the tank water collector header 25 into a degassifier 31 through a pump 32, heat exchanger 33 and demineralizer column 34 before being returned to the tank near the surface.

The arrangement shown in FIG. 3 illustrates a two-passage coolant flow in which the passage of coolant entering at the inlet manifold passage adjacent to the center of one or more concentrically placed fuel plates 40 encased in the fuel element pressure tube following a continuous path, is reversed upon contact with the closure cap 41 and returns adjacent the outer fuel plates to the plenum chamber 13. The central hold-down pin or tube 42 secured in the closure cap 41 with the acorn nut 43 seals the element and secures it on the plenum assembly. The plenum assembly comprises an upper grid plate 46, intermediate grid plate 47 and lower grid plate 48. The arrangement providing the return passage comprises in combination, an extended fuel plate 44 which is connected to a barrier tube 45. The upper extremity of the barrier tube 45 forms a seal with the extended fuel plate 44 and the lower extremity of the barrier tube 45 forms a seal with intermediate grid plate 47. It is thus seen that the coolant entering the inlet header 12 moves upward under pressure in the more internal passage of fuel plates 51 in contact with the fuel plates and is reflected at the closure cap at the top of the fuel element pressure tube between cap 41 and returns through the outer passage 52 into the outlet manifold 13. The exhausted coolant is recirculated in a closed cycle through the degassifier 26 etc. shown more completely in FIG. 2 before being returned to the inlet manifold 12.

Figure 4:
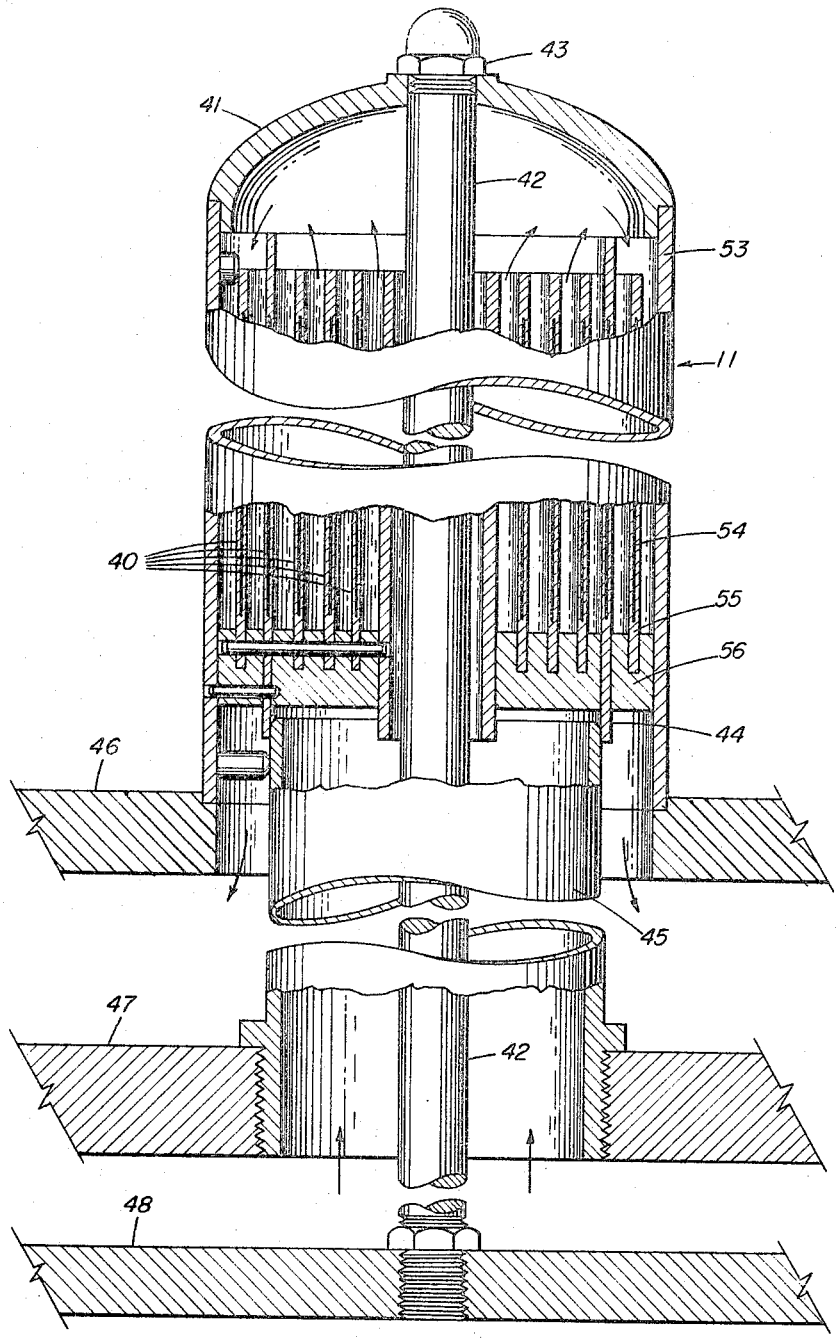
FIG. 4 is a longitudinal section view of a fuel element illustrating in greater detail a suitable structural arrangement of fuel plates and coolant passage.

The arrangement of the fuel element is shown in greater detail in FIG. 4 wherein an aluminum housing 53 closed at the top by an aluminum closure cap 41 is secured by means such as a threaded arrangement to the lower grid plate 48 by the hold-down pin or tube 42 and hold-down acorn nut 43 placed over the closure cap. Concentrically positioned in the aluminum housing 53 is a plurality of cylindrical fuel plates 40 which comprise suitable reactor fuel such as a layer uranium 54 clad with aluminum 55. To keep the fuel plates in space relationship, a convenient arrangement such as the spider 56 is employed. A suitable arrangement of the fuel plates 40 and spider 56 is illustrated in greater detail in FIGS. 5 and 6.

The fuel elements are illustrated generally as cylindrical. These cylinders may comprise an integral unit or the fuel element design alternately and predominantly for practical reasons may consist of cylindrical fuel plates made up of two or more sectors 57 of a cylinder joined together by radial webs 58 as shown in FIG. 7.

An important feature of the present invention resides in the reversibility of the individual fuel elements. As seen by the structure shown in the drawings, one of the fuel plates is extended at each end forming the aluminum tube 44. This fuel plate extension 44 fits around the barrier tube 45 and provides a barrier between the first and second pass within each fuel element. When it is sought to either remove or invert a fuel element, the hold-down nut 43 is removed from the hold-down rod or tube 42, the closure cap is removed and the fuel element with pressure housing is lifted and either withdrawn from the reactor and replaced or inverted and reused. In securing the fuel element, the procedure used in removing it is reversed. It will be apparent to those skilled in the art that the reversibility feature of the fuel element provides the advantage of higher burn-up over an element which lacks the reversible feature. Although the fuel elements illustrated show a construction providing a two-pass route of the coolant through the element before removal of the coolant from the core for cooling and demineralizing it will be apparent that structure permitting three or more passages may also be employed without departing from the contribution of the present invention.

Although I have described a limited number of features in the present disclosure and the use of the invention in a single reactor, it will be apparent that to those skilled in the art that variations in details are possible within the spirit of my invention. I contemplate that the invention shall not be limited except insofar as necessitated by the prior art and by the scope of the appended claims.

I claim:
1. A nuclear reactor comprising an open container for shielding liquid, an active core positioned substantially near the bottom within said open container, said core comprising a fuel element contained in a housing, said housing isolating said fuel element from shielding liquid in said open container, a multi-passage closed cycle in said housing for circulating a coolant through the core in a path isolated from the shielding liquid contained in said open container, and heat exchange means to remove heat from said coolant.

2. A nuclear reactor comprising an open container for shielding water, an active core positioned substantially near the bottom within said open container, said core comprising a plurality of fuel elements, at least one cylindrical fuel plate in each element positioned in a removable pressure housing, said pressure housing isolating said fuel plates from shielding water in said open container, a multi-passage closed cycle coolant path in said pressure housing isolated from the shielding water contained in said open container and heat exchange means to remove heat from said coolant.

3. A nuclear reactor comprising an open tank to contain shielding water, an active core positioned substantially near the bottom within said open tank, said core comprising a plurality of fuel elements, a cylindrical fuel plate in each fuel element positioned in a closed removable pressure housing, said pressure housing isolating said fuel plates from shielding water in said open tank, a multi-passage closed cycle coolant path in said pressure housing isolated from the shielding water contained in said open tank and defining the path of the coolant in more than one continued passage adjacent to said fuel plate and heat exchange means to remove heat from said coolant.

4. A nuclear reactor comprising an open tank to contain shielding water, an active core positioned substantially near the bottom within said open tank, said core comprising a plurality of fuel elements, a plurality of cylindrical fuel plates in each fuel element positioned concentrically in closed removable pressure housings, said pressure housings isolating said fuel plates from shielding water in said open tank, a multi-passage closed cycle coolant path in said pressure housing isolated from the shielding water contained in said open tank and heat exchange means to remove heat from said coolant.

5. The reactor of claim 4 employing at least 4 concentric fuel plates and in which in the fuel element one of the intermediate fuel plates is extended to provide a barrier for a continuous two passage flow of coolant through the pressure housing.

6. In an open tank reactor system comprising a core of fissionable material contained in a plurality of fuel elements positioned in a pool of shielding water, the method of removing heat generated by the nuclear reaction which comprises circulating coolant isolated from the shielding water and in a continuous path of at least two passes through said core, said path being defined by enclosures around individual fuel elements, removing heat from said coolant and recirculating said coolant through said core.

References Cited by the Examiner

UNITED STATES PATENTS

| | | |
|---|---|---|
| 2,736,696 | 2/1956 | Wigner. |
| 2,743,224 | 4/1956 | Ohlinger. |
| 2,770,591 | 11/1956 | Wigner et al. |
| 2,816,068 | 12/1957 | Ruano. |
| 2,832,733 | 4/1958 | Szilard. |
| 2,837,477 | 6/1958 | Fermi. |
| 2,841,545 | 7/1958 | Zinn. |
| 2,857,324 | 10/1958 | De Boisblanc et al. |
| 2,981,673 | 4/1961 | Johnson. |
| 3,053,746 | 9/1962 | Challender et al. |
| 3,071,527 | 1/1963 | Young. |

FOREIGN PATENTS

| | | |
|---|---|---|
| 563,693 | 1/1958 | Belgium. |
| 817,265 | 7/1959 | Great Britain. |

OTHER REFERENCES

Krushilin: Proceedings of the International Conference on the Peaceful Uses of Atomic Energy, vol. 2, U.N. Publication (August 1955), pages 435–448.

Yvon: Proceedings of the International Conference on the Peaceful Uses of Atomic Energy, vol. 2, U.N. Publication (August 1955), pages 337–347.

CARL D. QUARFORTH, *Primary Examiner.*

L. DEWAYNE RUTLEDGE, *Examiner.*

R. D. MORRIS, W. T. HOUGH, *Assistant Examiners.*